United States Patent [19]

Markos

[11] 4,139,961
[45] Feb. 20, 1979

[54] FISHNET WITH SPRING ACTUATED COVERS

[76] Inventor: Charles J. Markos, 8454 N. Chamise La., Clovis, Calif. 93612

[21] Appl. No.: 884,618

[22] Filed: Mar. 8, 1978

[51] Int. Cl.² .............................................. A01K 77/00
[52] U.S. Cl. ...................................................... 43/12
[58] Field of Search ................................. 43/11, 12, 1

[56] References Cited

U.S. PATENT DOCUMENTS

| | | | |
|---|---|---|---|
| 2,384,162 | 9/1945 | Finn | 43/12 |
| 2,772,502 | 12/1956 | Norris | 43/11 |
| 2,818,670 | 1/1958 | Darkenwald | 43/11 |

*Primary Examiner*—Nicholas P. Godici
*Attorney, Agent, or Firm*—H. Gordon Shields

[57] ABSTRACT

Fishnet apparatus includes a pair of clam shell type folding covers springloaded to the open position and actuable by a thumb release.

12 Claims, 6 Drawing Figures

U.S. Patent Feb. 20, 1979 Sheet 1 of 2 4,139,961
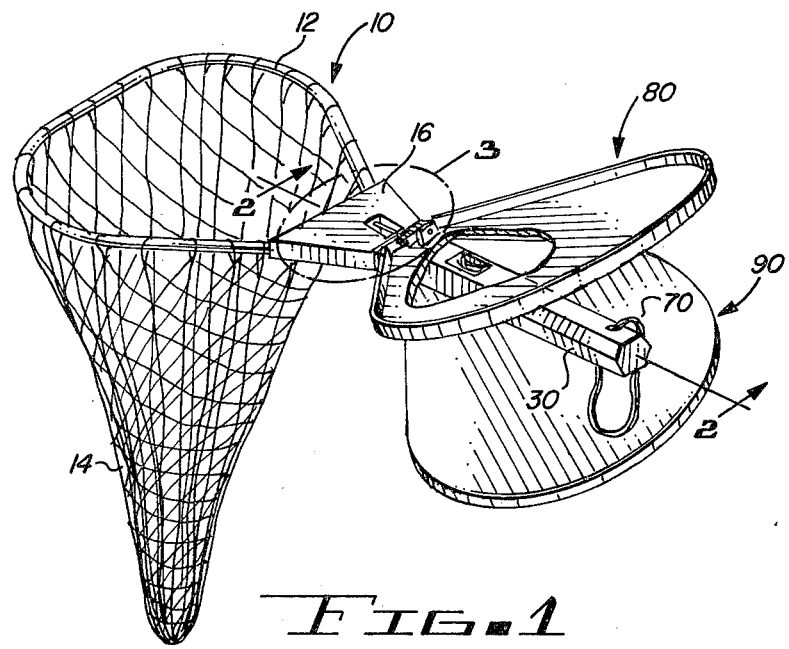
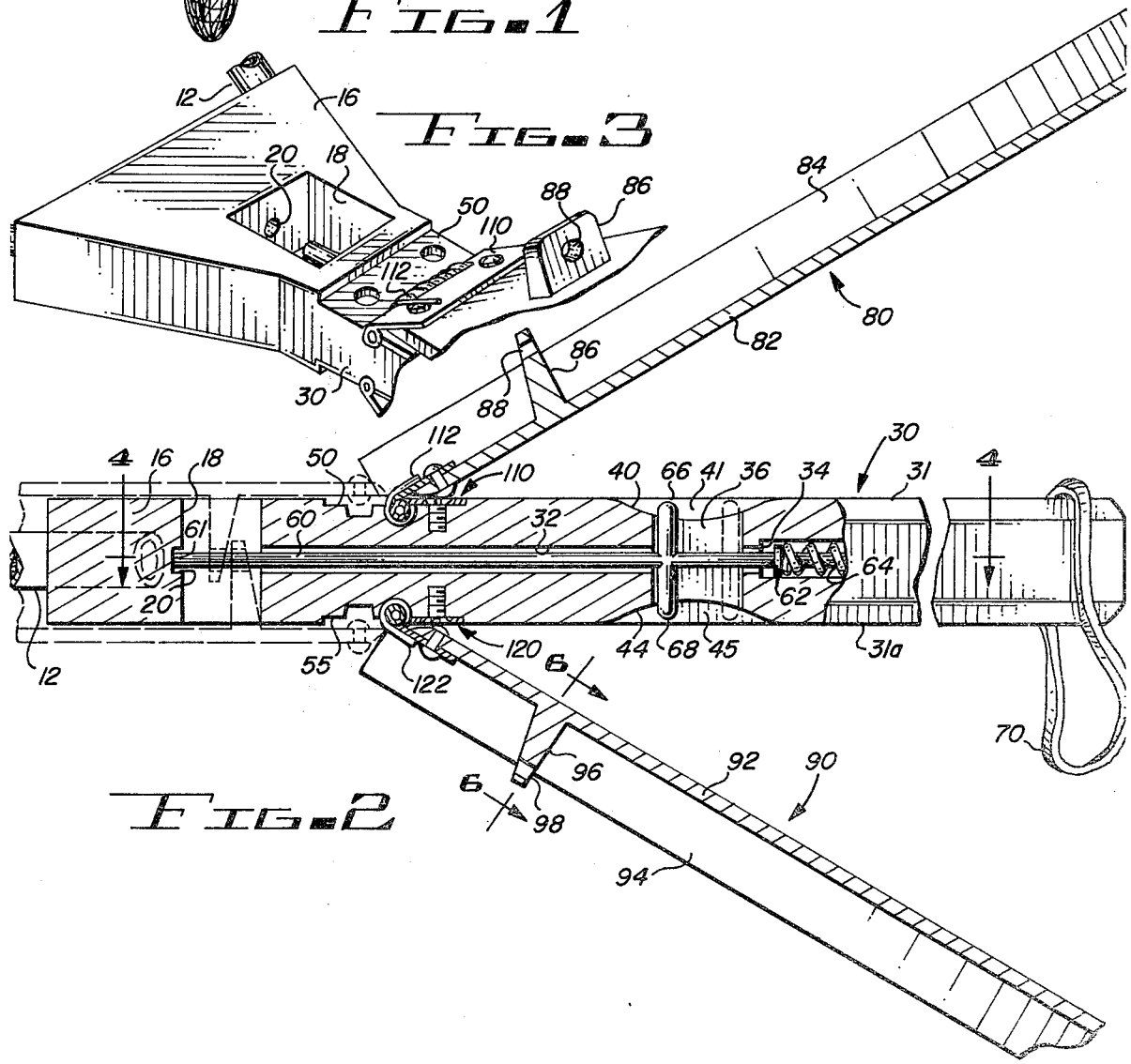

FISHNET WITH SPRING ACTUATED COVERS

BACKGROUND OF THE INVENTION

1. Field of the Invention

This invention relates to fishnets and, more particularly, to a fishnet having a pair of folding clam shell covers to protect the net from becoming snagged by brush and the like.

2. Description of the Prior Art

A fishnet is typically required for stream fishing. However, one of the major problems encountered with fishnets is their vulnerability to being snagged by brush, twigs, branches, and the like, which are typically found along stream banks.

Several different types of solutions have been suggested to the inherent problems of fishnets and snagging. For example U.S. Pat. No. 2,384,162 discloses a folding fishnet. The fishnet folds into a protective cover included with the handle. The obvious problems inherent with such an arrangement include the elongated handle, the difficulty in deploying the fishnet, and the imbalance resulting from the assymetrical configuration of the apparatus when the net is employed.

U.S. Pat. No. 2,619,755 discloses another proposed solution to the fishnet problem. The apparatus of the U.S. Pat. No. 2,619,755 patent discloses a collapsible fishnet. The fishnet collapses into an enlogated handle for carrying. The fishnet, from its collapsed and nested position within the handle, is moved forwardly, and, when the net is completely out of the handle, it opens under spring bias to the fully deployed position. The requirement of the elongated handle and the problem of deploying the net are two significant problems with the U.S. Pat. No. 2,619,755 apparatus. Another significant problem is snagging due to the longitudinal slot and the end configuration.

A combination of the ideas of the U.S. Pat. No. 2,384,162 and No. 2,619,755 patents is shown in U.S Pat. No. 2,772,502. The U.S. Pat. No. 2,772,502 patent discloses a fishnet which moves into and out of a protective cover axially aligned with, and as an integral part of, the handle of the net of the apparatus. As with the prior patents, the provision for deploying the net and the length of the handle required comprise disadvantages of the U.S. Pat. No. 2,772,502 apparatus.

U.S. Pat. No. 2,818,670 discloses a pair of clam shell covers spring loaded to the open position for protecting a fishnet. For deploying the apparatus, a lever on the cover is moved by the user to unlatch the clam shell covers and the clam shell covers move away from the net to allow the net to be used. One of the primary disadvantages of the U.S. Pat. No. 2,818,670 apparatus is the exposed nature of the mechanism which opens the clam shell covers. The problem of snagging such mechanism is very much present with the U.S. Pat. No. 2,818,670 apparatus. Thus, while the net is protected from external snagging, the entire apparatus is not protected from exterior snagging. The apparatus may be inadvertently deployed if the triggering rod is snagged as the user moves through brush, and the like. Moreover, there is a likelihood of damage to the latch apparatus due to its exterior location.

Another inherent disadvantage is the internal snagging of the net in its collasped or folded state because the "latch" extends through the net.

The disadvantage of the prior art are overcome with the apparatus of the present invention by providing a fully protected net deployable in a simple, foolproof manner, by the user of the apparatus.

SUMMARY OF THE INVENTION

The apparatus disclosed and claimed in the present application comprises a pair of clam shell covers which matingly engage each other to fully enclose or nest a fishnet within them and which clam shell type covers are spring-loaded to the open position upon the release of a pair of latch members by a rod extending axially within the handle of the fishnet apparatus.

Among the objects of the present invention are the following:

To provide new and useful fishnet apparatus;

To provide new and useful protected fishnet apparatus;

To provide new and useful fishnet apparatus having a pair of covers;

To provide new and useful fishnet apparatus including a pair of clam shell type covers springloaded to the open position;

To provide new and useful fishnet apparatus having a pair of protective covers actuable by thumb pressure of the user of the apparatus; and To provide new and useful fishnet apparatus including a pair of clam shell covers latched in the closed position by a rod extending longitudinally in the handle of the apparatus.

BRIEF DESCRIPTION OF THE DRAWING

FIG. 1 is a perspective view of the apparatus of the present invention.

FIG. 2 is a view in partial section of a portion of the apparatus of FIG. 1 taken generally along line 2—2 of FIG. 1.

FIG. 3 is a perspective view of a portion of the apparatus of FIG. 1 taken generally from circle 3 of FIG. 1.

DESCRIPTION OF THE PREFERRED EMBODIMENT

Figure 5:
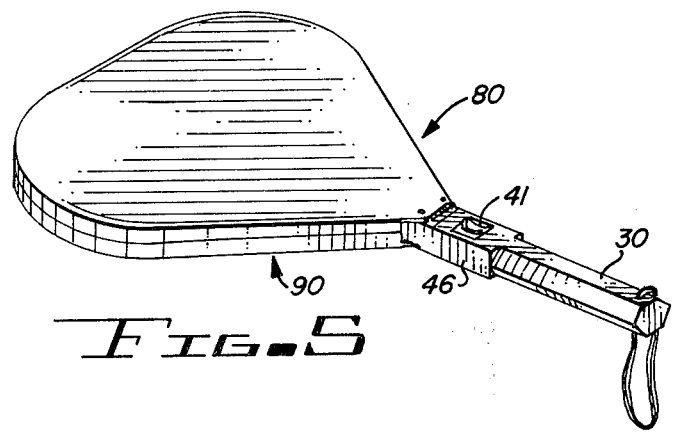
FIG. 5 is a perspective view of the apparatus of the present invention showing the apparatus with the covers in the closed position.

FIG. 1 is a perspective view of fishnet apparatus 10 embodying the present invention. The fishnet apparatus 10 includes a frame 12 to which is secured a net 14, shown in FIG. 1 as depending downwardly from the frame 12. The frame 12 is secured to a housing 16, which is of a generally triangular configuration. The frame 12 is secured to the base of the triangle, and a handle 30 is secured to the housing 16 at what would be the apex of the triangle. Details of the handle and the housing are found in FIGS. 1, 2, 3, 4, and 5. Reference should be made to those figures in the discussion concerning the handle and the housing.

FIG. 2 is a view and partial section of a portion of the apparatus of FIG. 1 taken generally along line 2—2 of FIG. 1. It comprises a view in partial section through a portion of the housing 16 and the handle 30 illustrating the latching and unlatching mechanism associated with the upper and lower clam shell covers 80 and 90, respectively.

FIG. 3 is an enlarged view of a portion of the apparatus of FIG. 1 taken generally from circle 3 of FIG. 1, and illustrating details of the housing 16 and handle 30.

Figure 4:
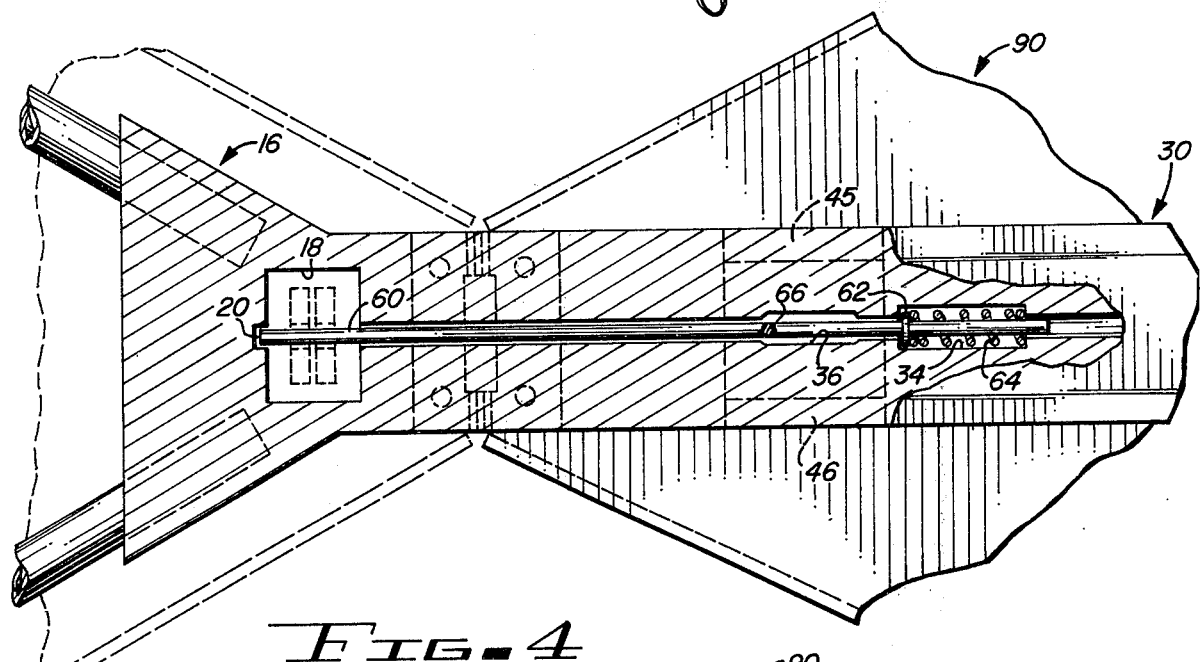
FIG. 4 is a view in partial section of a portion of the apparatus of FIG. 2 taken generally along line 4—4 of FIG. 2.

FIG. 4 is a view in partial section of a portion of the apparatus of FIG. 2 taken generally along line 4—4 of FIG. 2 showing the relationship between the housng 16 and the handle 30 with respect to the latching apparatus of the clam shell cover.

FIG. 5 is a perspective view of the apparatus of the present invention showing the clam shell covers 80 and 90 in their closed position.

Figure 6:
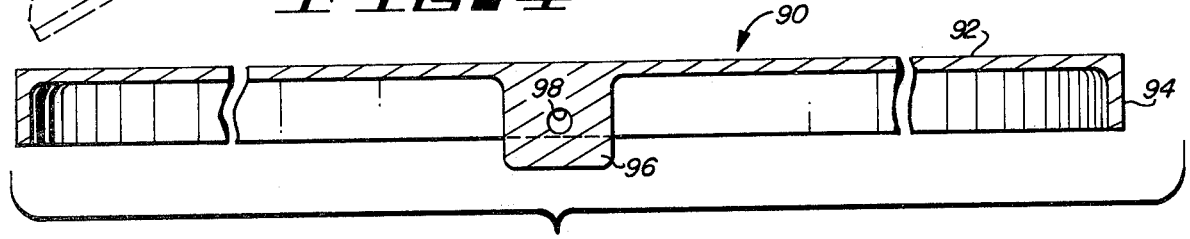
FIG. 6 is a view in partial section of a portion of the apparatus of FIG. 2 taken generally along line 6—6 of FIG. 2.

FIG. 6 is a view and partial section through lower clam shell 90 taken generally along line 6—6 of FIG. 2, and illustrating a locking tab 96 secured to a clam shell cover 90.

A pair of clam shell type coverings for the frame and net are secured to the handle adjacent a juncture of the handle and the housing. For purposes of orientation with respect to the apparatus shown in FIG. 1, an "upper" clam shell cover is designated by reference numeral 80, and a "lower" clam shell covering is designated by reference numeral 90. The fishnet apparatus is substantially symmetrical vertically, and the terms "upper" and "lower", and also "top" and "bottom", are used primarily for convenience herein. Details of the clam shells are shown in FIGS. 1, 2, 4, 5 and 6. Reference should be made to those figures regarding the discussion concerning the clam shell covers.

As best shown in FIGS. 1 and 2, the pair of clam shell covers 80 and 90 are secured to the handle 30 adjacent the housing 16. The clam shell covers 80 and 90 generally conform to the configuration of the frame 12 so that, in their closed position, as shown in FIG. 5, the frame 12 and the net 14 nest within the covers 80 and 90. The cover 80 includes a generally flat or planar portion 82 surrounded by a rim 84. The rim extends substantially perpendicular to the planar portion 82. A locking tab 86 is secured centrally with respect to the planar portion 82 adjacent the juncture of the cover 80 with the handle 30. An aperture 88 extends through the locking tab 86 to receive a locking rod 60. The cover 90 is substantially identical to the cover 80, and it includes a generally planar portion 92 surrounded by a vertically extending rim 94. A locking tab 96, with an aperture 98, is secured to the planar portion 92. The clam shell covers 80 and 90 abut each other in the closed position, as shown in FIG. 5, with the rims 84 and 94 in a touching or mating engagement.

The cover 80 is secured to the handle 30 by a hinge 110, and the cover 90 is secured to a hinge 120. The hinges 110 and 120 are preferably butt hinges, with one leaf of each hinge secured to the handle 30 and the other leaf secured to the covers 80 and 90, respectively. To provide for the smooth nesting of the clam shell covers against the handle 30 and over the housing 16 and the frame 12 and net 14, the hinges 110 and 120 extend into a pair of recesses or depressions 50 and 55 in the handle 30, as best shown in FIG. 2. Appropriate fastening means, such as screws or bolts, may be used to secure the hinges to the covers and to the handle.

Included with the hinges are a pair of coil springs 112 and 122, shown in FIG. 2. The springs 112 and 122 provide a bias between the handle and the covers 80 and 90, respectively, to urge the clam shell covers to the open position. The coil springs are wound about hinge pins which secure the leaves of the hinges together in a common, well known manner. The depressions 50 and 55 in the handle 30 include an appropriate recess for the coil springs.

An aperture 18 extends through the housing 16 at the juncture of the housing and the handle 30. The aperture 18 receives the locking tabe 86 and 96 of the clam shell covers 80 and 90, respectively.

Within the handle 30, and communicating with the aperture 18, is a longitudinal bore 32. The bore 32 is preferably disposed along the central, longitudinal axis of the handle 30. Coaxial with the bore 32, and remote from the aperture 18, is a slightly enlarged bore 34. The bore 34 is slightly larger in diameter than the bore 32. For convenience, the bore 32 may be referred to as a rod bore, and the bore 34 may be referred to as a spring bore. A locking rod 60 is disposed in the bore 32 and a portion of the rod 60 extends into the bore 34. Within the bore 34, the rod 60 includes a spring retainer 62. The spring retainer 62 is preferably a radially outwardly extending flange, the diameter of which is slightly larger than the diameter of the rod 60 and larger than the diameter of the bore 32, but less than the diameter of the bore 34. Within the bore 34, and concentrically disposed about the rod 60 is a coil compression spring 64. The spring 64 extends between the spring retainer 60 and the end of the bore 34 within the handle 30. The compression spring 64 provides a bias against the spring retainer 62 and accordingly against the rod 60 to bias the rod toward the aperture 18 and toward the housing 16.

Within the housing 16, and communicating with the aperture 18 and aligned with the bore 32, is a small bore or seat 20 which receives a front end 61 of the rod 60. The rod 60 is thus biased into the seat 20 by the compression spring 64.

The handle 30 includes a slot 36 extending diametrically through the handle 30 substantially perpendicular to the bore 32. A pair of depessions 40 and 44 extend into the handle 30 from what may be referred to for convenience as the "top" 31 of the handle and the "bottom" of the handle 31a, respectively. The depressions 40 and 44 are preferably smoothly curved from the "top" and "bottom" of the handle inwardly in a crescent shape to a maximum depth at the slot 36. The slots 40 and 44 comprise a pair of depressions or recesses in which a pair of trigger pins 66 and 68 are respectively disposed. The trigger pins 66 and 68 are secured to the rod 60 and are diametrically opposed with respect to each other and to the rod 60. The trigger pins move in the slot 36 and access to the pins is provided from the "top" and "bottom" of the handle 30 through the depressions 40 and 44. The thumb of the user extends into one of the depressions 40 or 44 to move the rod 60 against the bias of the spring 64 by contact with either the trigger pins 66 or 68, whichever is accessible to the thumb. That is, the user may grasp the handle from either the "top" or the "bottom" and still actuate the apparatus. The trigger pin 66 is protected by a pair of webs or side walls 41 and 42 which comprise the sides for the depression 40. Similarly, the trigger pin 68 is protected by a pair of webs or side walls 45 and 46 which comprise sides for the depression 44. Thus the rod 60 is protected from inadvertent actuation by the webs or walls on both sides of the depressions or recesses to prevent the trigger pins from being accidentally snagged or caught by a tree branch, or the like. The tops of the trigger pins preferably are recessed below the "top" and "bottom" of the handle 30, and the webs 41, 42, 45, 46, comprise a continuation of the handle to prevent inadvertent movement of the trigger pins and the rod to unlatch the covers 80 and 90.

With the covers folded against each other in the closed position, the rod 60 extends through the apertures 88 and 98 of the locking tabs 86 and 96 respectively, to latch or lock the covers in the closed position. The end 61 of the rod 60 extends into or is seated in the small bore 20 and is held there by the action of the compression spring 64 against the spring retainer 62. Positive movement of the rod 60 by thumb pressure against either trigger 66 or trigger 68 is required to move the end 61 of the rod 60 out of the bore 20 and out of the apertures 88 and 98 of the locking tabs 86 and 96, respectively, to allow the clam shell doors or covers to open.

A thong or loop 70 is shown in FIGS. 1, 2, and 5 as secured to the handle 30 remote from the frame 12 and net 14. The thong or loop is thus located at the rear end of the fishnet apparatus.

In operation, the clam shell covers are closed to fully enclose the net protectively against snagging. The user of the apparatus may suspend the apparatus for carrying by the thong 70 for carrying purposes. With the covers thus closed, and the latching apparatus substantially enclosed, the exterior of the fishnet apparatus 10 presents virtually no likelihood of accidental or inadvertent opening or snagging. When the net is needed, the fisherman simply grasps the handle 30 of the apparatus 10 in any convenient manner, with a thumb on the "top" or "bottom", and places his thumb in depression 40 or depression 44. Thumb pressure against either the trigger pins 66 or 68 will move the rod 60 axially rearwardly against the bias of the spring 64 to disengage the rod 60 from the locking tabs 86 and 96. With the rod 60 out of the apertures 88 and 98 in the locking tabs, the covers open substantially to the position shown in FIG. 2 under the bias of the springs 112 and 122. The net 14 then automatically deploys for use.

The hinges 110 and 120 allow the covers 80 and 90 to open only to a limited extent, substantially as shown in FIG. 2, due to the construction of the covers. However, if desired, stops, either incorporated into the handle or into the covers could be employed to further limit the extent of the opening of the covers. Such stops could include cushioning means, if desired.

Axial movement of the rod 60 releases one cover slightly before the other, as shown in FIG. 2. For example, movement of the rod 60 axially by thumb pressure against either trigger 66 or trigger 68 results in the removal of the rod end 61 first from the aperture 88 of locking tab 86, shown in phantom in FIG. 2, and then from the aperture 98 of locking tab 96, also shown in phantom in FIG. 2, to thus allow the clam shell cover 80 to be released slightly before the clam shell cover 90. In this manner the inadvertent binding of the two clam shells by interference between the locking tabs is prevented. If desired, the spring 112 may be slightly stronger than the spring 122 to ensure that cover 80 moves out of the way of cover 90.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Fishnet apparatus, comprising, in combination:
   a frame;
   a net secured to the frame;
   housing means secured to the frame;
   a first aperture extending through the housing;
   handle means secured to the housing;
   bore means in the handle communicating with the first aperture;
   a first cover pivotally secured to the handle means and movable from a closed position adjacent the frame for covering the frame and the net to an open position remote from the frame and the net;
   a first locking tab secured to the first cover and extending into the first aperture when the first cover is in the closed position;
   a second aperture extending through the first locking tab and aligned with the bore means in the handle means when the first cover is in the closed position;
   a second cover pivotally secured to the handle means and movable from a closed position adjacent the frame for covering the frame and the net to an open position remote from the frame and the net, the first and second covers comprising a pair of covers cooperating with each other, and matingly engaging each other in the closed position to protectively enclose the frame and the net;
   a second locking tab secured to the second cover and extending into the first aperture when the second cover is in the closed position;
   a third aperture extending through the second locking tab and aligned with the bore means in the handle means when the second cover is in the closed position;
   rod means in the bore means movable from a first position in which a portion of the rod extends through the first aperture, the second aperture, and the third aperture to maintain the first and second covers in the closed position, to a second position in which the rod is withdrawn from the second and third apertures to allow the covers to move to the open position; and
   means for biasing the first and second covers to the open position.

2. The apparatus of claim 1 in which the housing means includes a seat for receiving a portion of the rod means.

3. The apparatus of claim 2 in which the seat is coaxially aligned with the bore means and communicates with the first aperture.

4. The apparatus of claim 1 in which the handle means includes recess means communicating with the bore means.

5. The apparatus of claim 4 in which the rod means includes trigger means extending into the recess means for moving the rod means in the bore means.

6. The apparatus of claim 5 in which the trigger means includes a first trigger portion and a second trigger portion diametrically aligned with the first trigger portion and extending substantially perpendicular to the rod means disposed in the bore means.

7. The apparatus of claim 6 in which the rod means further includes a spring for biasing the rod means in the bore means.

8. The apparatus of claim 7 in which the bore means includes a first bore and a second bore, and the spring for biasing the rod means is disposed in the second bore.

9. The apparatus of claim 8 in which the rod means further includes a spring retainer disposed between the spring and the trigger means and in the second bore.

10. The apparatus of claim 9 in which the diameter of the spring retainer is greater than the diameter of the first bore.

11. The apparatus of claim 10 in which the first bore and the second bore are coaxially aligned.

12. The apparatus of claim 1 in which the handle means includes
- first and second hinges secured to the handle and to the first and second covers, respectively,
- first and second recesses for receiving the first and second hinges; and
- the means for biasing the first and second covers to the open position comprises springs secured to the first and second hinges.

* * * * *